United States Patent Office 3,337,579
Patented Aug. 22, 1967

3,337,579
UNSYMMETRICAL 2,2'-ALKYLENE-BISBENZIMIDAZOLES
Joseph J. Ursprung, Portage Township, Kalamazoo County, Mich., assignor to The Upjohn Company, Kalamazoo, Mich., a corporation of Delaware
No Drawing. Filed Sept. 15, 1961, Ser. No. 138,254
5 Claims. (Cl. 260—309.2)

This application is a continuation-in-part of application Ser. No. 39,788, filed June 30, 1960, now abandoned.

This invention relates to novel chemical compounds and a process for their preparation and is more particularly concerned with novel unsymmetrically alkyl-substituted 2,2'-alkylenebisbenzimidazoles and the acid addition salts thereof.

The novel compounds of the invention are selected from the class consisting of (a) an unsymmetrically substituted compound represented by the following formula:

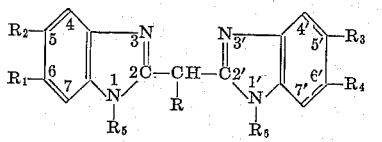

wherein R is selected from the class consisting of hydrogen and lower-alkyl, for example, methyl, ethyl, propyl, butyl, amyl, hexyl, and isomeric forms thereof, $R_1$ and $R_2$ represent lower-alkyl, for example, methyl, ethyl, propyl, and isopropyl, $R_3$ and $R_4$ are selected from the class consisting of hydrogen and lower-alkyl, for example, methyl, ethyl, propyl, and isopropyl at least one of $R_3$ and $R_4$ being lower-alkyl, $R_5$ and $R_6$ are selected from the class consisting of hydrogen and lower-alkyl, for example, methyl, ethyl, propyl, butyl, and isomeric forms thereof, and wherein the substitution in one benzimidazole nucleus differs from that in the other benzimidazole nucleus, and (b) the pharmacologically acceptable acid addition salts thereof.

The novel compounds of the invention exhibit pharmacological activity. For example, the compounds of the invention can be used as diuretics and sedatives in the treatment of animals and humans. In addition, the compounds of the invention can be used as intermediates in the preparation of dyestuffs in accordance with U.S. Patent 2,697,712.

The novel compounds of the invention having the Formula I can be prepared in a convenient manner as follows:

(a) A 4,5-dialkyl-1,2-phenylenediamine having the following formula:

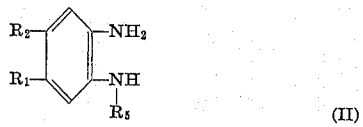

(II)

wherein $R_1$, $R_2$, and $R_5$ have the significance hereinbefore defined, is condensed with a carbalkoxyacetimino alkyl ether hydrochloride

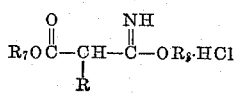

wherein $R_7$ and $R_8$ represent alkyl groups, preferably ethyl, and R has the significance hereinbefore defined, to form the corresponding alkyl 2-(5,6-dialkyl-2-benzimidazolyl)alkanoate according to the following equation:

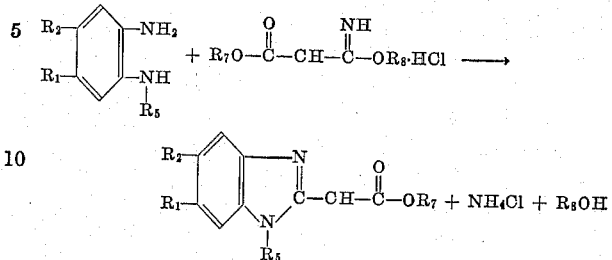

The reaction is carried out advantageously by bringing the reactants together in substantially equimolar proportions in the presence of an inert solvent, illustratively, a lower alkanol such as methanol, ethanol, isopropanol, and the like. For the sake of convenience it is preferable to carry out the reaction at elevated temperatures such as the boiling point of the inert solvent, but ordinary temperatures can be employed if desired. Generally speaking, the reaction is carried out advantageously at a temperature within the range of about 20° C. to about 150° C. and preferably within the range of about 35° C. to about 105° C.

The desired compound is isolated from the reaction mixture by conventional procedures, for example, by dilution of the reaction mixture with water, followed by basification of the solution and isolation of the precipitate by filtration. The compound so obtained can be purified by conventional procedures, for example, by recrystallization.

(b) The alkyl 2-(5,6-dialkyl-2-benzimidazolyl)alkanoate so obtained is then condensed with the appropriately substituted 1,2-phenylenediamine having the formula:

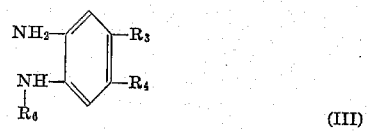

(III)

wherein $R_3$, $R_4$, and $R_6$ have the significance hereinbefore defined, to obtain the desired compound having the Formula I. The reaction can be represented as follows:

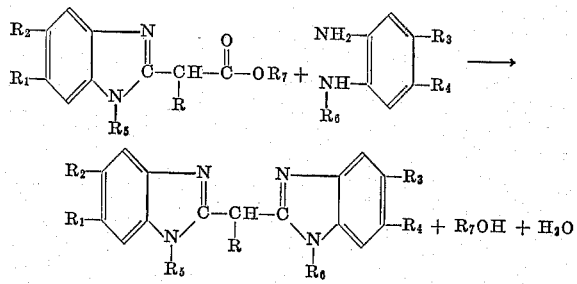

Advantageously the reaction is carried out by heating the reactants together alone, or if desired, in the presence of an inert solvent such as trichlorobenzene, decalin, tetralin, and the like. Preferably the reaction is carried out in the presence of the inert solvent at a temperature within the range of about 150° C. to about 250° C. and preferably within the range of about 175° C. to about 225° C. Advantageously, the reactants are present in substantially equimolar proportions. Generally speaking, the desired compound having the Formula I separates on cooling the reaction mixture and can be isolated by filtration. The desired compound having the Formula I can be purified by conventional procedures, for example, by recrystallization.

It will be appreciated that the above procedure can be varied by employing the phenylenediamine having the Formula III in stage (a) and the phenylenediamine (II) in stage (b). That is to say, in a variation of the above process, stage (a) comprises the condenstion of a phenylendiamine having the Formula III with a carbalkoxyacetimino alkyl ether hydrochloride

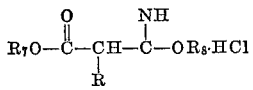

to yield the corresponding alkyl 2-(2-benzimidazolyl) alkanoate. Stage (b) then comprises the reaction of the latter compound with a phenylenediamine having the Formula II to yield the desired compound having the Formula I.

The carbalkoxyacetimino alkyl ether hydrochloride employed in stage (a) of the process described above is prepared readily by treating the corresponding alkyl α-cyanoalkanoate

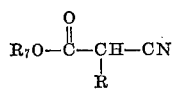

wherein R and $R_7$ have the significance hereinbefore defined, with hydrogen chloride in the presence of the appropriate alkanol $R_8OH$, wherein $R_8$ has the significance hereinbefore defined. The reaction is carried out advantageously by passing anhydrous hydrogen chloride gas into a mixture of the alkyl α-cyanoalkanoate and the alkanol $R_8OH$ in solution in an inert solvent such as ether. Preferably the reaction is carried out at a temperature of the order of 0° C. The alkyl α-cyanoalkanoate and alkanol are employed in substantially equimolar proportions and the desired hydrochloride separates from the reaction mixture. Generally speaking, the product so obtained is in a sufficient state of purity to be used without further treatment but, if desired, the compound can be purified by conventional procedures, for example, by recrystallization.

The 4,5-dialkyl-1,2-phenylenediamines having the Formula II above, which are employed as starting materials in the above-described process, can be prepared by methods which are well-known in the art. For example, the diamines of Formula II wherein $R_5$ is hydrogen can be prepared by nitration of the corresponding 1,2-dialkylbenzenes to yield the corresponding 1,2-dialkyl-4-nitrobenzene, reduction of the latter to the corresponding 3,4-dialkylaniline, conversion of the aniline so obtained to its urethane, nitration of the latter followed by hydrolysis to yield the corresponding 4,5-dialkyl-2-nitroaniline, and reduction of the nitro compounds so obtained to yield the desired 4,5-dialkyl-1,2-phenylenediamine. The procedure involved in the above series of reactions is preferably that described by Lambooy, J. Am. Chem. Soc. 71, 3756, 1949, for the preparation of 4,5-diethyl-1,2-phenylenediamine.

The 1,2-phenylenediamines having the Formula III above wherein $R_3$ and $R_4$ represents lower-alkyl and $R_6$ is hydrogen, which are employed as starting materials in the above-described reaction, can be prepared using the method described above for the preparation of the 1,2-phenylenediamines having the Formula II.

The 1,2-phenylenediamines having the Formula III above wherein $R_3$ or $R_4$ represents hydrogen and $R_6$ is hydrogen, which are employed as starting materials in the above-described reaction, can also be prepared by methods which are well-known in the art. For example, such diamines in which $R_4$ represents hydrogen can be prepared by nitrating the corresponding 1-alkyl-4-bromobenzene, treating the 1-alkyl-4-bromo-3-nitrobenzene so obtained with alcoholic ammonia to obtain the corresponding 1-alkyl-4-amino-3-nitrobenzene, and reducing the latter compound to obtain the desired compound having the Formula III. The reaction conditions employed are advantageously those described by Karrer et al., Helv. Chim. Acta 17, 1516, 1934, for the preparation of 4-ethyl-1,2-phenylenediamine from 4-bromo-1-ethylbenzene.

The 1,2-phenylenediamines having the Formulae II and III above wherein $R_5$ and $R_6$ represent lower-alkyl, which are employed as starting compounds in the above-described reaction, can be prepared by known methods, e.g., the method described in U.S. Patent 2,400,872 for the preparation of N-methyl- and N-ethyl-1,2-phenylenediamine.

The acid addition salts of the invention comprise the salts of the compounds having the Formula I above with pharmacologically acceptable acids such as sulfuric, hydrochloric, hydrobromic, nitric, phosphoric, benzoic, p-toluenesulfonic, salicylic, acetic, propionic, tartaric, citric, and succinic acids, and the like. The acid addition salts of the invention can be prepared by conventional methods. For example, the compound having the Formula I can be treated with at least a stoichiometric amount of the appropriate acid; according to the nature of the solvent employed the desired salt will separate spontaneously or can be precipitated by the addition of a solvent in which the salt is insoluble.

The novel compounds of the invention can be combined with solid or liquid pharmaceutical carriers and formulated as tablets, powder packs, or capsules, using starch and like excipients, or dissolved or suspended in suitable solvents or vehicles, for oral or parenteral administration.

The following examples are illustrative of the process and products of the present invention but are not to be constructed as limiting.

EXAMPLE 1

*5,5′,6-trimethyl-2,2′-methylenebisbenzimidazole and the dihydrochloride thereof*

A. 2-CARBETHOXYACETIMINO ETHYL ETHER HYDROCHLORIDE

A solution of 113 g. (1 mole) of ethyl cyanoacetate in a mixture of 46 g. (1 mole) of anhydrous ethanol and 3 liters of anhydrous ether was stirred and cooled to 0° C. Anhydrous hydrogen chloride was passed into the cooled solution until the latter was saturated. The mixture was then stirred at 0° C. for a further 3 hours. The solid which was separated was isolated by filtration, washed thoroughly with ether on the filter, and dried in vacuo. There was thus obtained 179 g. of 2-carbethoxyacetimino ethyl ether hydrochloride in the form of a white solid having a melting point of 111 to 113° C. with decomposition.

B. ETHYL 2-(5,6-DIMETHYL-2-BENZIMIDAZOLYL) ACETATE

A mixture of 6.8 g. (0.05 mole) of 4,5-dimethyl-1,2-phenylenediamine (Beilsteins Handbuch der Organischen Chemie, 13, 179, 4th edition, 1930), and 9.8 g. (0.05 mole) of 2-carbethoxyacetimino ethyl ether hydrochloride (prepared as described above) in 100 ml. of absolute ethanol was heated under reflux for 1 hour. To the cooled mixture was added 100 ml. of water and the resulting slurry was made alkaline by the addition of aqueous ammonium hydroxide solution. The solid which had separated was isolated by filtration, washed thoroughly with water, and recrystallized from ethanol. There was thus obtained 8 g. of ethyl 2-(5,6-dimethyl-2-benzimidazolyl) acetate in the form of a crystalline solid having a melting point of 177 to 181° C.

C. 5,5',6-TRIMETHYL-2,2'-METHYLENEBIS-BENZIMIDAZOLE

A mixture of 4.64 g. (0.02 mole) of ethyl 2-(5,6-dimethyl-2-benzimidazolyl)acetate (prepared as described above), 2.44 g. of 4-methyl-1,2-phenylenediamine (Beilsteins Handbuch der Organischen Chemie, 13, 148, 4th edition, 1930), and 50 ml. of 1,2,4-trichlorobenzene was stirred and heated to 180° C. At this temperature evolution of ethanol and water commenced. The temperature of the reaction mixture was then raised over the next 15 minutes to 210° C. and maintained at this level for a further 15 minutes. The reaction mixture was then cooled and diluted with benzene. The solid which has separated was isolated by filtration, washed with benzene, and dried in vacuo. There was thus obtained 5,5',6-trimethyl-2,2'-methylenebisbenzimidazole.

D. THE DIHYDROCHLORIDE OF 5,5',6-TRIMETHYL-2,2'-METHYLENEBISBENZIMIDAZOLE

A suspension of 5.82 g. (0.02 mole) of 5,5',6-trimethyl-2,2'-methylenebisbenzimidazole in 50 ml. of absolute ethanol was stirred vigorously and heated to approximately 60° C. To the warm solution was added slowly a solution of 1.5 g. (0.041 mole) of anhydrous hydrogen chloride in 50 ml. of absolute ethanol. The mixture was stirred for a further 15 minutes after the addition was complete. The cooled mixture was treated with 50 ml. of acetone and the suspension so obtained was cooled in ice and stirred for 2 hr. The solid which had separated was isolated by filtration, washed with two 25-ml. portions of acetone, and dried in vacuo. There was thus obtained the dihydrochloride of 5,5',6-trimethyl-2,2'-methylenebisbenzimidazole in the form of a crystalline solid having a melting point of 320 to 335° C.

*Analysis.*—Calcd. for $C_{18}H_{20}Cl_2N_4$: C, 59.51; H, 5.55; Cl, 19.52; N, 15.42. Found: 59.07; H, 5.62; Cl, 18.83; N, 15.35.

EXAMPLE 2

*5,5',6-trimethyl-2,2'-methylenebisbenzimidazole*

Using the procedure described in Example 1, Part B, but substituting 4-methyl-1,2-phenylenediamine for 4,5-dimethyl-1,2-phenylenediamine, there is obtained ethyl 2-(5-methyl-2-benzimidazolyl)acetate. The latter compound is then reacted with 4,5-dimethyl-1,2-phenylenediamine using the procedure described in Example 1, Part C, to obtain 5,5',6-trimethyl-2,2'-methylenebisbenzimidazole.

EXAMPLE 3

*5,6-dimethyl-5'-ethyl-2,2'-methylenebisbenzimidazole and the dihydrochloride thereof*

Using the procedure described in Example 1, Part C, but substituting 4 - ethyl - 1,2 - phenylenediamine (Karrer et al., supra) for 4-methyl-1,2-phenylenediamine, there is obtained 5,6-dimethyl-5'-ethyl-2,2' - methylenebisbenzimidazole. The latter compound is converted to its dihydrochloride using the procedure described in Example 1, part D.

EXAMPLE 4

*5,6-diethyl-5'-methyl-2,2'-methylenebisbenzimidazole and the dihydrochloride thereof*

Using the procedure described in Example 1, Part B, but substituting 4,5-diethyl-1,2-phenylenediamine (Lambooy, supra) for 4,5-dimethyl - 1,2 - phenylenediamine, there is obtained ethyl 2-(5,6-diethyl-2-benzimidazolyl) acetate. The latter compound is then condensed with 4-methyl-1,2-phenylenediamine, using the procedure described in Example 1, Part C, to obtain 5,6-diethyl-5'-methyl-2,2'-methylenebisbenzimidazole. The compound so obtained is converted to its dihydrochloride using the procedure described in Example 1, Part D.

EXAMPLE 5

*5,5',6-trimethyl-2,2'-propylidenebisbenzimidazole and the dihydrochloride thereof*

Using the procedure described in Example 1, Part A, but substituting ethyl α-cyanobutyrate (Alexander et al., J. Am. Chem. Soc. 66, 886, 1944) for ethyl cyanoacetate, there is obtained 2-carbethoxybutyrimino ethyl ether hydrochloride. Using the procedure described in Example 1, Part B, but substituting 2-carbethoxybutyrimino ethyl ether hydrochloride for 2-carbethoxyacetimino ethyl ether hydrochloride, there is obtained ethyl 2-(5,6-dimethyl-2-benzimidazolyl)butyrate. The latter compound is then condensed with 4-methyl-1,2-phenylenediamine, using the procedure described in Example 1, Part C, to obtain 5,5',6 - trimethyl - 2,2'-propylidenebisbenzimidazole. The compound so obtained is converted to its dihydrochloride using the procedure described in Example 1, Part D.

EXAMPLE 6

*5,5',6-trimethyl-2,2'-ethylidenebisbenzimidazole and the dihydrochloride thereof*

Using the procedure described in Example 1, Part A, but substituting ethyl α-cyanopropionate for ethyl cyanoacetate, there is obtained 2 - carbethoxypropionimino ethyl ether hydrochloride. Using the procedure described in Example 1, Part B, but substituting 2-carbethoxypropionimino ethyl ether hydrochloride for 2-carbethoxyacetimino ethyl ether hydrochloride, there is obtained ethyl 2-(5,6-dimethyl-2-benzimidazolyl)propionate. The latter compound is then condensed with 4-methyl-1,2-phenylenediamine, using the procedure described in Example 1, Part C, to obtain 5,5',6-trimethyl-2,2'-ethylidenebisimidazole. The compound so obtained is converted to its dihydrochloride using the procedure described in Example 1, Part D.

EXAMPLE 7

*5,5',6-triethyl-2,2'-methylenebisbenzimidazole and the dihydrochloride thereof*

Using the procedure described in Example 1, Part B, but substituting 4,5-diethyl-1,2-phenylenediamine (Lambooy, supra) for 4,5-dimethyl - 1,2 - phenylenediamine, there is obtained ethyl 2-(5,6-diethyl-2-benzimidazolyl) acetate. The latter compound is then condensed with 4-ethyl-1,2-phenylenediamine (Karrer et al., supra) using the procedure described in Example 1, Part C, to obtain 5,5',6-triethyl-2,2'-methylenebisbenzimidazole. The compound so obtained in converted to its dihydrochloride by the procedure described in Example 1, Part D.

EXAMPLE 8

*5,6-dimethyl-5',6'-diethyl-2,2'-methylenebisbenzimidazole and the dihydrochloride thereof*

Using the procedure described in Example 1, Part C, but substituting 4,5-diethyl-1,2-phenylenediamine for 4-methyl-1,2 - phenylenediamine, there is obtained 5,6 - dimethyl-5',6'-diethyl-2,2'-methylenebisbenzimidazole. The compound so obtained in converted to its dihydrochloride using the procedure described in Example 1, Part D.

EXAMPLE 9

*5,6-dimethyl-5'-6'-diethyl-2,2'-propylidenebisbenzimidazole*

Using the procedure described in Example 1, Part C, 4,5-diethyl-1,2-phenylenediamine is condensed with ethyl 2-(5,6-dimethyl-2-benzimidazolyl)butyrate (prepared as described in Example 5) to obtain 5,6-dimethyl-5',6'-diethyl-2,2'-propylidenebisbenzimidazole.

EXAMPLE 10

*5,5',6-trimethyl-2,2'-(2,4-dimethylpentylidene)bisbenzimidazole and the dihydrochloride thereof*

Using the procedure described in Example 5, but substituting ethyl α-cyano-β,δ-dimethylcaproate (Alexander et al., supra) for ethyl α-cyanobutyrate, there are obtained 5,5′,6-trimethyl-2,2′-(2,4-dimethylpentylidene)bisbenzimidazole and the dihydrochloride thereof.

EXAMPLE 11

*1′-ethyl-5,5′,6-trimethyl-2,2′-methylenebisbenzimidazole and the dihydrochloride thereof*

A. 2′-NITRO-4′,5′-DIMETHYL-p-TOLUENESULFON-ANILIDE SODIUM SALT

To a solution of 16.6 g. of 2-nitro-4,5-dimethylaniline (Takatori et al., J. Pharm. Soc. Japan 75, 881, 1955; C. A. 50, 4920i, 1956) in 50 ml. of pyridine was added 19.0 g. of p-toluenesulfonyl chloride. The mixture was heated on a steam bath for 1 hr., cooled, and poured into ice-water. The resulting yellow solid was recovered by filtration, washed with water, and dried. The dried solid was dissolved in hot ethanol, and to this solution was added a methanol solution of sodium methoxide. By filtering this mixture there was obtained 14.0 g. of 2′-nitro-4′,5′-dimethyl-p-toluenesulfonanilide sodium salt as a bright yellow solid having a melting point of 310 to 315° C. (dec.).

B. 2′-NITRO-4′,5′-DIMETHYL-N-ETHYL-p-TOLUENE-SULFONANILIDE

A solution of 15 g. (0.044 mole) of 2′-nitro-4′,5′-dimethyl-p-toluenesulfonanilide sodium salt (Part A) and 8 g. (0.051 mole) of ethyl iodide in 75 ml. of dimethylformamide was heated on a steam bath for two hours, cooled, and treated with an approximately equal volume of water. An oil separated which slowly solidified. The solid was recovered on a filter, and dissolved in hot ethanol. Upon cooling, 12 g. of 2′-nitro-4′,5′-dimethyl-N-ethyl-p-toluenesulfonanilide having a melting point of 130 to 132° C. was obtained.

*Analysis.*—Calcd. for $C_{17}H_{20}N_2O_4S$: C, 58.60; H, 5.79; N, 8.04. Found: C, 58.52; H, 5.72; N, 8.31.

C. 2-NITRO-4,5-DIMETHYL-N-ETHYLANILINE

A solution of 12 g. (0.034 mole) of 2′-nitro-4′,5′-dimethyl-N-ethyl-p-toluenesulfonanilide (Part B) in a mixture of 15 ml. of concentrated sulfuric acid and 3 ml. of water was heated on a steam bath for 3.5 hrs. The reaction mixture was cooled and poured into ice-water. An orange solid separated which was recovered on a filter and dissolved in hot ethanol. On cooling, there was obtained 6.5 g. of 2-nitro-4,5-dimethyl-N-ethylaniline as an orange solid having a melting point of 71 to 74° C.

*Analysis.*—Calcd. for $C_{10}H_{14}N_2O_2$: C, 61.83; H, 7.27; N, 14.43. Found: C, 61.47; H, 6.74; N, 14.53.

D. 4,5-DIMETHYL-N-ETHYL-1,2-PHENYLENEDIAMINE DIHYDROCHLORIDE AND FREE BASE

A suspension of 6.5 g. (0.033 mole) of 2-nitro-4,5-dimethyl-N-ethylaniline (Part C) in 50 ml. of ethanol acidified with 3 ml. of concentrated hydrochloric acid was hydrogenated in the presence of platinum oxide catalyst until the theoretical amount of hydrogen had been absorbed. The suspension was filtered to remove the catalyst, and the solvent was removed under reduced pressure. The residue thus obtained was dissolved in hot ethanol and poured into ether with vigorous stirring. An oil separated and slowly solidified. The solid was recovered on a filter and dried. There was thus obtained 7.6 g. of 4,5-dimethyl-N-ethyl-1,2-phenylenediamine dihydrochloride having a melting point of 135 to 138° C. The free base was obtained by neutralizing the hydrochloride with base in the conventional manner.

E. 1-ETHYL-5,5′,6-TRIMETHYL-2,2′-METHYLENEBIS-BENZIMIDAZOLE AND THE DIHYDROCHLORIDE THEREOF

Following the procedure of Example 1, Part B, but substituting 4,5-dimethyl-N-ethyl-1,2-phenylenediamine for 4,5-dimethyl-1,2-phenylenediamine, there was prepared ethyl 2-(5,6-dimethyl-1-ethyl-2-benzimidazolyl)acetate, which in turn was reacted with 4-methyl-1,2-phenylenediamine according to the procedure of Example 1, Part C, to obtain 1-ethyl-5,5′,6-trimethyl-2,2′-methylenebisbenzimidazole. The latter was converted to 1-ethyl-5,5′,6-trimethyl-2,2′-methylenebisbenzimidazole dihydrochloride by the procedure of Example 1, Part D.

EXAMPLE 12

*1,5,5′,6-tetramethyl-2,2′-methylenebisbenzimidazole and the dihydrochloride thereof*

A. 2′-NITRO-N,4′,5′-TRIMETHYL-p-TOLUENE-SULFONANILIDE

A solution of 7.0 g. (0.02 mole) of 2′-nitro-4′,5′-dimethyl-p-toluenesulfonanilide sodium salt (Example 11, Part A) and 7.0 g. (0.05 mole) of methyl iodide in 50 ml. of dimethylformamide was heated on a steam bath for 45 min., cooled, and poured into an approximately equal volume of water. The precipitate thus obtained was recovered by filtration, washed with water, and dried, to give 6.4 g. of 2′-nitro-N,4′,5′-trimethyl-p-toluenesulfonanilide having a melting point of 148 to 150° C.

*Analysis.*—Calcd. for $C_{16}H_{18}N_2O_4S$: C, 57.47; H, 5.43; N, 8.38; S, 9.59. Found: C, 57.37; H, 5.83; N, 8.23; S, 9.81.

B. 2-NITRO-N,4,5-TRIMETHYLANILINE

A solution of 6.4 g. (0.02 mole) of 2′-nitro-N,4′,5′-trimethyl-p-toluenesulfonanilide in a mixture of 10 ml. of concentrated sulfuric acid and 1 ml. of water was heated for 3.5 hrs. on a steam bath, cooled, and poured into ice-water. The red solid that separated was filtered, washed thoroughly with water, and dried. Recrystallization from ethanol-water gave 3.25 g. of 2-nitro-N,4,5-trimethylaniline as a bright red solid melting at 138 to 140° C.

*Analysis.*—Calcd. for $C_9H_{12}N_2O_2$: C, 59.98; H, 6.71; N, 15.55. Found: C, 59.87; H, 7.11; N, 15.55.

C. N,4,5-TRIMETHYL-1,2-PHENYLENEDIAMINE DIHYDROCHLORIDE AND FREE BASE

A solution of 3.12 g. of 2-nitro-N,4,5-trimethylaniline in 25 ml. of ethanol acidified with 1.5 ml. of concentrated hydrochloric acid was hydrogenated in the presence of platinum oxide catalyst until the theoretical amount of hydrogen had been absorbed. The suspension was filtered and the solution was evaporated to dryness. The oil substance thus obtained was dissolved in about 5 ml. of ethanol, and ether was added. The colorless solid which separated was recovered on a filter, washed with ether, and dried. There was thus obtained 3.80 g. of N,4,5-trimethyl-1,2-phenylenediamine dihydrochloride having a melting point of 192 to 194° C. The free base was obtained by neutralizing the dihydrochloride with base in the conventional manner.

D. 1,5,5′,6-TETRAMETHYL-2,2′-METHYLENEBISBENZIMIDAZOLE AND THE DIHYDROCHLORIDE THEREOF

Following the procedure of Example 1, Part B, but substituting N,4,5-trimethyl-1,2-phenylenediamine for 4,5-dimethyl-1,2-phenylenediamine, there was prepared ethyl 2-(1,5,6-trimethyl-2-benzimidazolyl)acetate, which in turn was reacted with 4-methyl-1,2-phenylenediamine according to the procedure of Example 1, Part C, to obtain 1,5,5′,6-tetramethyl-2,2′-methylenebisbenzimidazole. The latter was converted to 1,5,5′,6-tetramethyl-2,2′-methylenebisbenzimidazole dihydrochloride by the procedure of Example 1, Part D.

EXAMPLE 13

*1,5,5′,6-tetramethyl-2,2′-methylenebisbenzimidazole and the dihydrochloride thereof*

Following the procedure of Example 1, Parts C and D, but substituting N,4-dimethyl-1,2-phenylenediamine for 4-methyl-1,2-phenylenediamine, there is prepared 1,5,5′,6-tetramethyl-2,2′-methylenebisbenzimidazole and 1,5,5′, 6-tetramethyl-2,2'-methylenebisbenzimidazole dihydrochloride, respectively.

EXAMPLE 14

*1-n-butyl-5,5',6-trimethyl-2,2'-methylenebisbenzimidazole*

Following the procedure of Example 11, Part B, but substituting n-butyl iodide for ethyl iodide, there is prepared 2'-nitro-4',5'-dimethyl-N-n-butyl-p-toluenesulfonanilide, which in turn is treated according to the procedures of Example 11, Parts C and D, to obtain N-n-butyl-4,5-dimethyl-1,2-phenylenediamine. The thus-obtained N-n-butyl-4,5-dimethyl-1,2-phenylenediamine is substituted for 4,5-dimethyl-1,2-phenylenediamine in the procedure of Example 1, Part B, to obtain ethyl 2-(1-n-butyl-5,6-dimethyl-2-benzimidazolyl)acetate, which is then reacted with 4-methyl-1,2-phenylenediamine according to the procedure of Example 1, Part C, to obtain 1-n-butyl-5,5',6-trimethyl-2,2'-methylenebisbenzimidazole.

I claim:
1. A compound selected from the class consisting of (a) an unsymmetrically substituted compound having the formula:

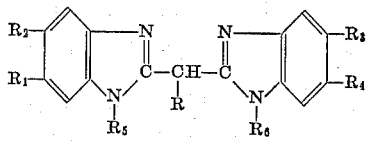

wherein R is selected from the class consisting of hydrogen and lower-alkyl, $R_1$ and $R_2$ represent lower-alkyl, $R_3$ and $R_4$ are selected from the class consisting of hydrogen and lower-alkyl, at least one of which is lower-alkyl, $R_5$ and $R_6$ are selected from the class consisting of hydrogen and lower-alkyl, and wherein the substitution in one benzimidazole nucleus differs from that in the other benzimidazole nucleus, and (b) the pharmacologically acceptable acid addition salts thereof.
2. 5,5',6-trimethyl-2,2'-methylenebisbenzimidazole.
3. 5,5',6-trimethyl-2,2'-methylenebisbenzimidazole dihydrochloride.
4. 5,5',6-trimethyl-2,2'-ethylidenebisbenzimidazole.
5. 5,5',6-trimethyl-2,2'-ethylidenebisbenzimidazole dihydrochloride.

References Cited

UNITED STATES PATENTS

| | | | |
|---|---|---|---|
| 2,479,152 | 8/1949 | Brooker | 260—240.7 |
| 2,697,712 | 12/1954 | Arnold | 260—309.2 |
| 2,969,372 | 1/1961 | Braun et al. | 260—310 |
| 2,969,373 | 6/1961 | Loev et al. | 260—310 |
| 3,105,837 | 10/1963 | Upsprung | 260—309.2 |

FOREIGN PATENTS

| | | |
|---|---|---|
| 618,889 | 3/1949 | Great Britain. |
| 677,540 | 8/1952 | Great Britain. |

OTHER REFERENCES

Arnold et al.: Chem. Abstracts, vol. 52, p. 17241 (1958).
David et al.: Chem. Abstracts, vol. 51, column 8020 (1957).
Feitelson et al.: J. Chem. Soc., 1952, pp. 2389–98.
Lane: J. Chem. Soc., 1953, pp. 2238–40.
Lane: J. Chem. Soc., 1955, pp. 1079–81.
Wang et al.: J. Am. Chem. Soc., vol. 79, pp. 5706-8 (1957).
Wang, Dissertation Abstracts, vol. 17, p. 2828 (1957).
Wang: Ph. D. Dissertation: "Synthesis of Bis-Benzimidazoles as Potential Antimetabolites," pp. 6, 12, 13 (Univ. Microfilms, Ann Arbor, Michigan).

WALTER A. MODANCE, *Primary Examiner.*

D. T. McCUTCHEN, N. TROUSOF,
*Assistant Examiners.*